United States Patent [19]

Spencer et al.

[11] Patent Number: 5,573,162
[45] Date of Patent: Nov. 12, 1996

[54] UTILITY BOX FOR AN ATV VEHICLE

[76] Inventors: Ted M. Spencer; Ted F. Lohse, both of P.O. Box 86, Artois, Calif. 95913

[21] Appl. No.: 402,531

[22] Filed: Mar. 10, 1995

[51] Int. Cl.$^6$ ................................ B62J 7/02; B62J 7/06
[52] U.S. Cl. .................. 224/401; 224/430; 224/435; 224/463
[58] Field of Search .................... 224/401, 406, 224/407, 408, 410, 30 R, 32 R, 36, 32 A, 274, 404, 534, 328, 568, 428–431, 433, 435, 463, 488, 572; D12/406, 407, 408, 409, 410; 220/DIG. 25, 507, 324, 326, 343

[56] References Cited

U.S. PATENT DOCUMENTS

| D. 224,074 | 6/1972 | Harmon, Jr. | D12/410 |
| D. 244,927 | 7/1977 | Anthon, III | D12/410 |
| D. 259,780 | 7/1981 | Davidson | D12/410 |
| D. 343,815 | 2/1994 | Kamata | D12/410 |
| 1,961,181 | 6/1934 | Von der Heydt | 220/326 |
| 2,654,516 | 10/1953 | Edwards | 224/328 |
| 2,786,596 | 3/1957 | Claud-Mantle | 220/326 |
| 4,066,196 | 1/1978 | Jackson et al. | 224/431 |
| 4,809,891 | 3/1989 | Patrin | 224/32 R |
| 4,844,305 | 7/1989 | McKneely | 224/404 |
| 4,844,309 | 7/1989 | Aubin et al. | 224/401 |

FOREIGN PATENT DOCUMENTS

| 853858 | 11/1960 | United Kingdom | 224/32 R |
| 2180737 | 4/1987 | United Kingdom | 224/32 A |

OTHER PUBLICATIONS

Wixom Bros. Co. (Advertisement, Magazine not Known) Published Feb. 1969; Located in D12/410.

*Primary Examiner*—Henry J. Recla
*Assistant Examiner*—Gregory M. Vidovich

[57] ABSTRACT

A utility box for an ATV vehicle comprised of a U-shaped container portion having a plurality of compartments therein. The U-shaped container portion has two securement latches pivotally secured to a front wall. A U-shaped lid portion is adapted for removable securement over the U-shaped container. The U-shaped lid portion is hingedly secured to the U-shaped container. A front wall of the lip portion has two securement portions. The two securement portions are adapted for engagement with the two securement latches of the U-shaped container for securing the U-shaped lid portion over the U-shaped container. Four securement portions are adapted to secure the U-shaped container to a utility rack of an ATV vehicle.

1 Claim, 3 Drawing Sheets

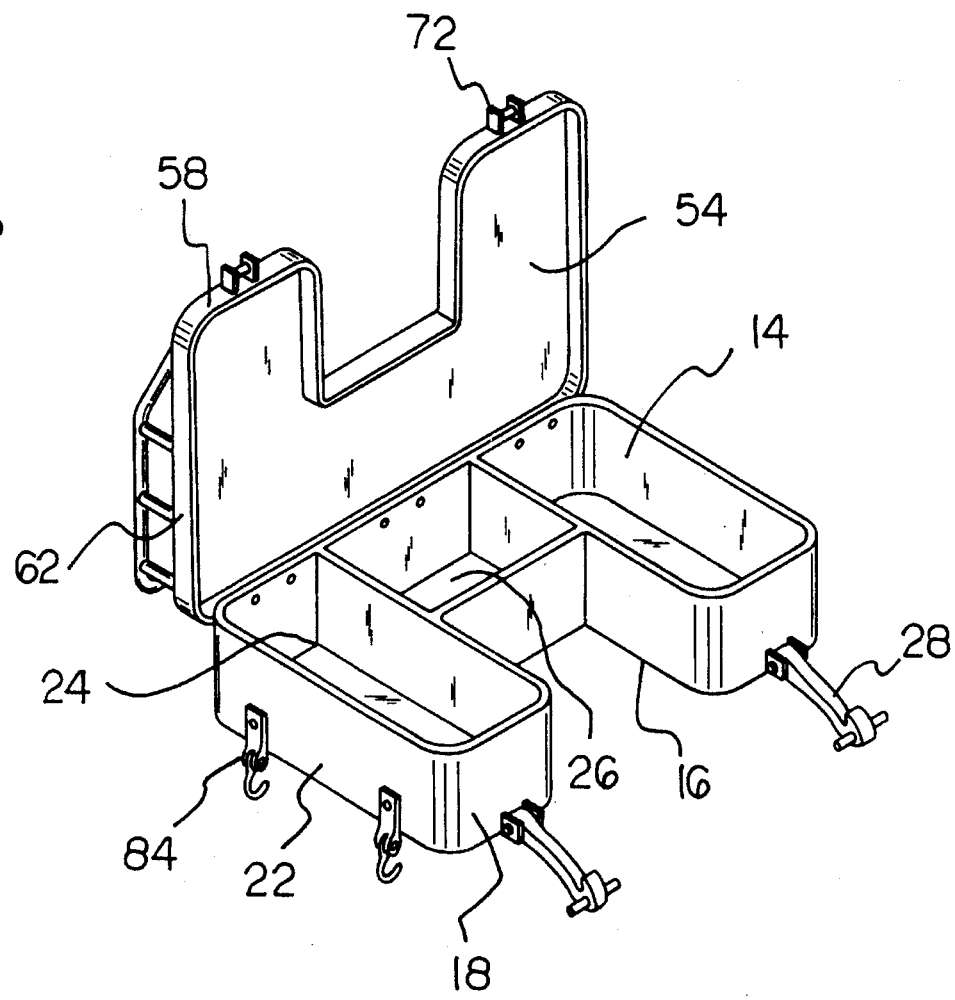
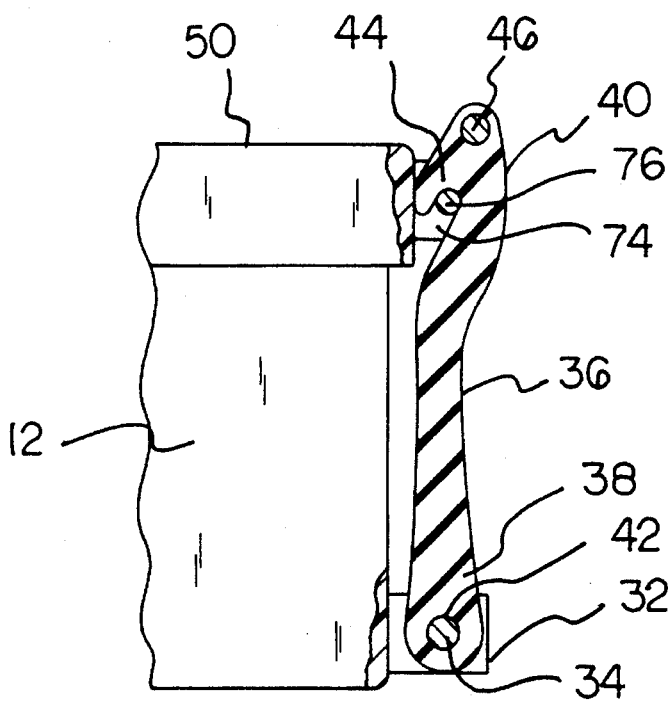

UTILITY BOX FOR AN ATV VEHICLE

BACKGROUND OF THE INVENTION

1. Field of the Invention

The present invention relates to a utility box for an ATV vehicle and more particularly pertains to providing storage for items carried while on an ATV vehicle with a utility box for an ATV vehicle.

2. Description of the Prior Art

The use of storage boxes is known in the prior art. More specifically, storage boxes heretofore devised and utilized for the purpose of holding tools and the like are known to consist basically of familiar, expected and obvious structural configurations, notwithstanding the myriad of designs encompassed by the crowded prior art which have been developed for the fulfillment of countless objectives and requirements.

By way of example, Edwards et al. U.S. Pat. No. 5,314,239 discloses an ATV backrest arranged for mounting to an all terrain vehicle in spaced adjacency to the vehicle's seat is provided.

U.S. Pat. No. 5,236,062 to Laney discloses an ATV support rack apparatus. The frame assembly includes a rectilinear framework to include fully projecting legs to receive projecting legs of the second frame assembly in an adjustable relationship.

Sams U.S. Pat. No. 4,570,986 discloses a combined pickup bumper and tool box.

Pru U.S. Pat. No. 4,138,152 discloses a storage box bumper assembly for vehicles.

Dent U.S. Pat. No. 3,614,136 discloses a combined bumper and tool box.

While these devices fulfill their respective, particular objective and requirements, the aforementioned patents do not describe a utility box for an ATV vehicle for providing storage for items carried while on an ATV vehicle.

In this respect, the utility box for an ATV vehicle according to the present invention substantially departs from the conventional concepts and designs of the prior art, and in doing so provides an apparatus primarily developed for the purpose of providing storage for items carried while on an ATV vehicle.

Therefore, it can be appreciated that there exists a continuing need for new and improved utility box for an ATV vehicle which can be used for providing storage for items carried while on an ATV vehicle. In this regard, the present invention substantially fulfills this need.

SUMMARY OF THE INVENTION

In the view of the foregoing disadvantages inherent in the known types of storage boxes now present in the prior art, the present invention provides an improved utility box for an ATV vehicle. As such, the general purpose of the present invention, which will be described subsequently in greater detail, is to provide a new and improved utility box for an ATV vehicle and method which has all the advantages of the prior art and none of the disadvantages.

To attain this, the present invention essentially comprises a U-shaped container portion having an open top, a closed bottom, a front wall, a back wall, two side walls, two large outer containers, and a small inner container. The U-shaped container portion has two securement latches pivotally secured to the front wall. The device contains a U-shaped lid portion having an upper surface, a lower surface, and a lip portion extending downwardly from an outer periphery thereof. The lip portion has a front wall, a back wall, and two side walls. The U-shaped lid portion is adapted for removable securement over the open top of the U-shaped container. The back wall of the lip portion of the U-shaped lid portion is hingedly secured to the back wall of the U-shaped container. The front wall of the lip portion has two securement portions. The two securement portions are adapted for engagement with the two securement latches of the front wall of the U-shaped container for securing the U-shaped lid portion over the U-shaped container. The upper surface of the U-shaped lid portion has a non-skid surface. The upper surface has a U-shaped fence portion extending around an outer periphery thereof. The device contains four securement portions. Each of the four securement portions has an elastic strap. The elastic strap has an upper end and a lower end. The lower end has a hook portion pivotally secured thereto. Two of the upper ends of the elastic strap are secured to one of the two side walls of the U-shaped container portion. Two of the other upper ends are secured to an opposing side wall of the U-shaped container portion. The four securement portions are adapted to secure the U-shaped container to a utility rack of an ATV vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved utility box for an ATV vehicle which has all the advantages of the prior art storage boxes and none of the disadvantages.

It is another object of the present invention to provide a new and improved utility box for an ATV vehicle which may be easily and efficiently manufactured and marketed.

It is a further object of the present invention to provide a new and improved utility box for an ATV vehicle which is of durable and reliable construction.

An even further object of the present invention is to provide a new and improved utility box for an ATV vehicle which is susceptible of a low cost of manufacture with regard to both materials and labor, and which accordingly is then susceptible of low prices of sale to the consuming public, thereby making such a utility box for an ATV vehicle economically available to the buying public.

Still yet another object of the present invention is to provide a new and improved utility box for an ATV vehicle which provides in the apparatuses and methods of the prior art some of the advantages thereof, while simultaneously overcoming some of the disadvantages normally associated therewith.

Even still another object of the present invention is to provide a new and improved utility box for an ATV vehicle for providing storage for items carried while on an ATV vehicle.

Lastly, it is an object of the present invention to provide a new and improved utility box for an ATV vehicle comprised of a U-shaped container portion having a plurality of compartments therein. The U-shaped container portion has two securement latches pivotally secured to a front wall. A U-shaped lid portion is adapted for removable securement over the U-shaped container. The U-shaped lid portion is hingedly secured to the U-shaped container. A front wall of the lip portion has two securement portions. The two securement portions are adapted for engagement with the two securement latches of the U-shaped container for securing the U-shaped lid portion over the U-shaped container. Four securement portions are adapted to secure the U-shaped container to a utility rack of an ATV vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention with the lid in an open position.

FIG. 4 is a cross-sectional view of the lid latch of the present invention.

The same reference numerals refer to the same parts through the various figures.

DESCRIPTION OF THE PREFERRED EMBODIMENT

Figure 1:
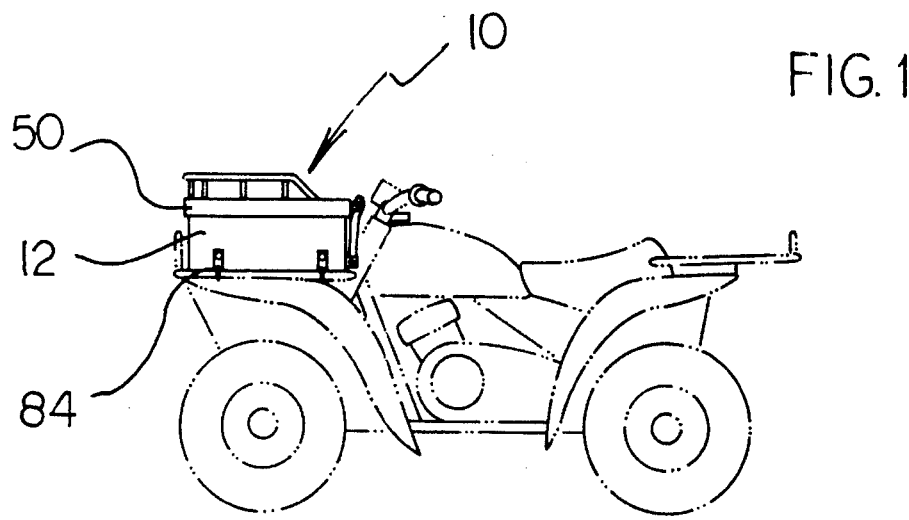
FIG. 1 Is a side view of the present invention in place on the ATV vehicle.
Figure 2:
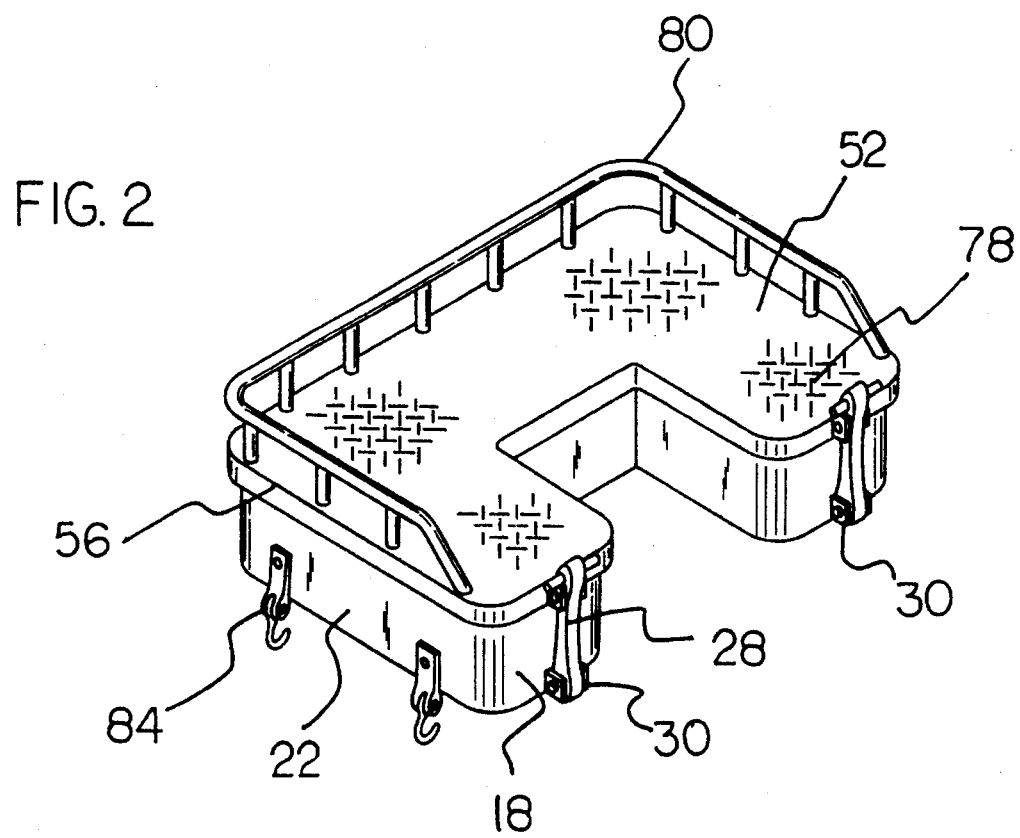
FIG. 2 is a perspective view of the preferred embodiment of the utility box for an ATV vehicle constructed in accordance with the principles of the present invention.
Figure 5:
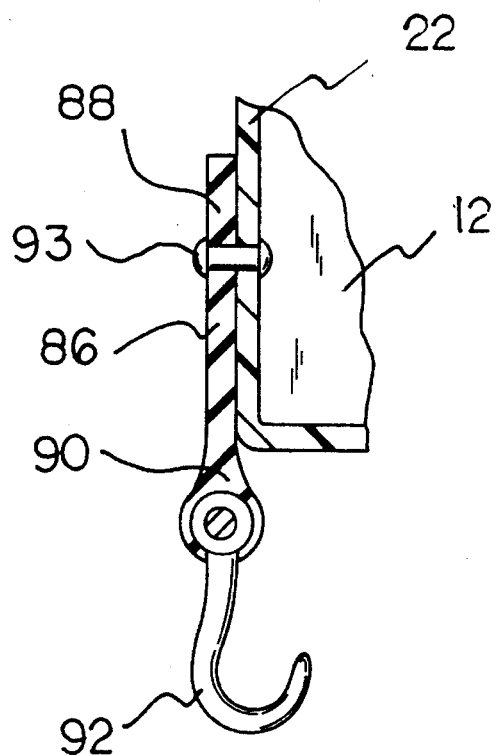
FIG. 5 is a cross-sectional view of the rubber hold down cords of the present invention.
Figure 6:
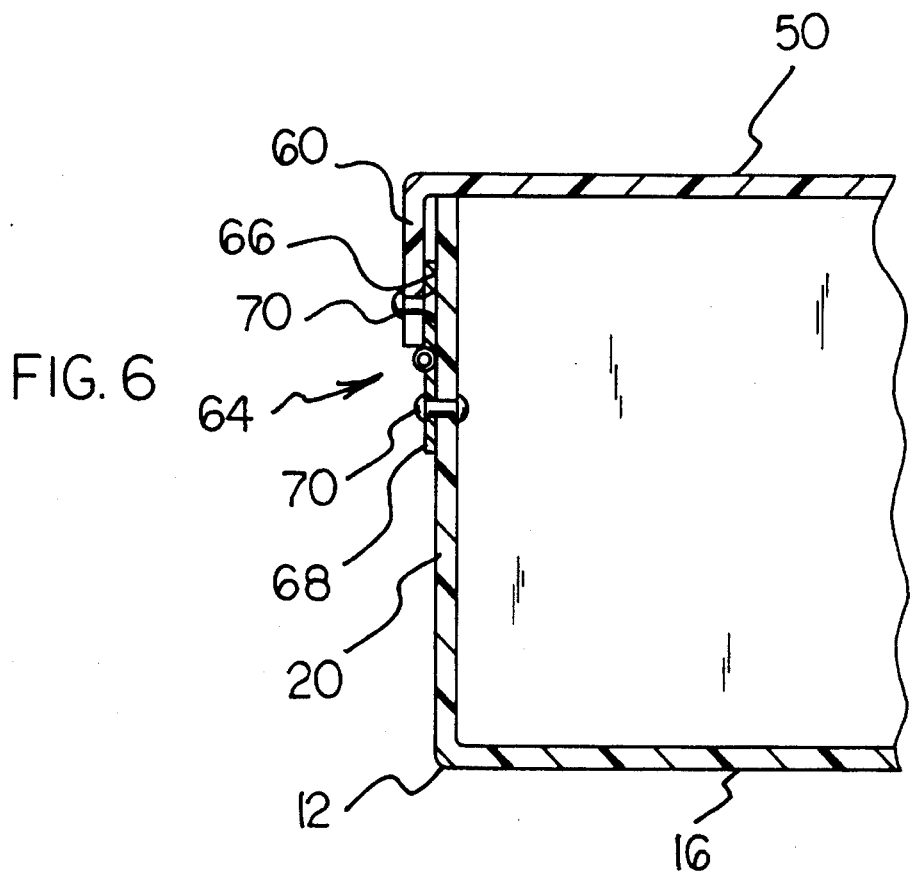
FIG. 6 is a partial side view of the present invention detailing the hinged lid.

With reference now to the drawings, and in particular, to FIG. 1–6 thereof, the preferred embodiment of the new and improved utility box for an ATV vehicle embodying the principles and concepts of the present invention and generally designated by the reference number 10 will be described.

Specifically, it will be noted in the various figures that the device relates to a new and improved utility box for an ATV vehicle for providing storage for items carried while on an ATV vehicle. In its broadest context, the device consists of a U-shaped container portion, a U-shaped lid portion, and four securement portions.

The device 10 contains a U-shaped container portion 12 having an open top 14, a closed bottom 16, a front wall 18, a back wall 20, two side walls 22, two large outer containers 24, and a small inner container 26. The U-shaped container portion 12 has two securement latches 28 pivotally secured to the front wall 18. The two securement latches 28 each have a bracket portion 30 secured to the front wall 18 of the U-shaped container portion 12. The bracket portion 30 have two outwardly extending portions 32 and a securement bar 34 therebetween. The two securement latches 28 each has a latch portion 36. The latch portion 36 has a lower end 38 and an upper end 40. The lower end 38 has an aperture 42 formed therethrough. The aperture 42 engages the securement bar 34 of the bracket portion 30 for pivotal engagement thereto. The upper end 40 has a hooked portion 44 thereon. The hooked portion 44 has a handle portion 46 extending outwardly from opposing sides thereof.

The device 10 contains a U-shaped lid portion 50 having an upper surface 52, a lower surface 54, and a lip portion 56 extending downwardly from an outer periphery thereof. The lip portion 56 has a front wall 58, a back wall 60, and two side walls 62. The U-shaped lid portion 56 is adapted for removable securement over the open top 14 of the U-shaped container 12. The back wall 60 of the lip portion 56 of the U-shaped lid portion 50 is hingedly secured to the back wall 20 of the U-shaped container 12 by a hinge portion 64. The hinge portion 64 is comprised of an upper bracket 66 and a lower bracket 68. The upper bracket 66 is secured to an inner surface of the back wall 60 of the lip portion 56 by a rivet 70. The lower bracket 68 is secured to an outer surface of the back wall 20 of the U-shaped container portion 12 by a rivet 70. The front wall 58 of the lip portion 56 has two securement portions 72. The two securement portions 72 are adapted for engagement with the two securement latches 28 of the front wall 18 of the U-shaped container 12 for securing the U-shaped lid portion 50 over the U-shaped container 12. The two securement portions 72 have two outwardly extending portions 74 secured to the front wall 58 of lip portion 56 of the U-shaped lid portion 50. The two outwardly extending portions 74 have a securement bar 76 positioned therebetween. The securement bar 76 engages the hooked portion 44 of the two securement latches 28 for securement thereto. The upper surface 52 of the U-shaped lid portion 50 has a non-skid surface 78. The non-skid surface 78 prevent any objects held thereon from sliding around and falling off of the U-shaped lid portion 50. The upper surface 52 has a U-shaped fence portion 80 extending around an outer periphery thereof. The U-shaped fence portion 80 contains the objects contained on the upper surface 52 of the U-shaped lid portion 50. The U-shaped fence portion having an opening that would face the user when the device 10 is in place on an ATV vehicle.

The device 10 contains four securement portions 84. Each of the four securement portions 84 has an elastic strap 86. The elastic strap 86 has an upper end 88 and a lower end 90. The lower end 90 has a hook portion 92 pivotally secured thereto. Two of the upper ends 88 of the elastic strap 86 are secured to one of the two side walls 22 of the U-shaped container portion 12 by a rivet 93. Two of the other upper ends 88 are secured to an opposing side wall 22 of the U-shaped container portion 12. The four securement portions 84 are adapted to secure the U-shaped container 12 to a utility rack 94 of an ATV vehicle 96. The elastic strap 86 allows the four securement portions 84 to be tightly secured to the utility rack 94 thereby limiting any drastic movements of the device 10 when a user is driving the ATV vehicle 96.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A utility box for an all terain vehicle for providing storage for items carried while on the all terrain vehicle, the all terrain vehicle having front and rear portions wherein the front portion has a rack secured thereto, said box comprising, in combination:

a U-shaped container portion having an open top, a closed bottom, a front wall, a back wall, and two side walls, the container portion having a compartmented interior defining two large outer containers and a small inner container, the U-shaped container portion having two securement latches pivotally secured to the front wall, the U-shaped container portion dimensioned for positioning on the front portion on the ATV vehicle whereby free ends of the U-shaped container extending around the front portion of the all terrain vehicle to allow access thereto while a user drives the all terrain vehicle;

a U-shaped lid portion having an upper surface, a lower surface, and a lip portion extending downwardly from an outer periphery thereof, the lip portion having a front wall, a back wall, and two side walls, the U-shaped lid portion adapted for removable securement over the open top of the U-shaped container portion, the back wall of the lip portion of the U-shaped lid portion being hingedly secured to the back wall of the U-shaped container portion, the front wall of the lip portion having two securement portions, the two securement portions adapted for engagement with the two securement latches of the front wall of the U-shaped container portion for securing the U-shaped lid portion over the U-shaped container portion, the upper surface of the U-shaped lid portion having a non-skid surface, the upper surface having a U-shaped fence portion extending around an outer periphery thereof;

four securement portions, each of the four securement portions having an elastic strap, each elastic strap having an upper end and a lower end, the lower end having a hook portion pivotally secured thereto, two of the upper ends secured to one of the two side walls of the U-shaped container portion, two of the other upper ends secured to an opposing side wall of the U-shaped container portion, the four securement portions adapted to secure the U-shaped container portion to the utility rack of the ATV vehicle.

\* \* \* \* \*